P. KLINE.
HARVESTER.
No. 172,034.  Patented Jan. 11, 1876
FIG. I.
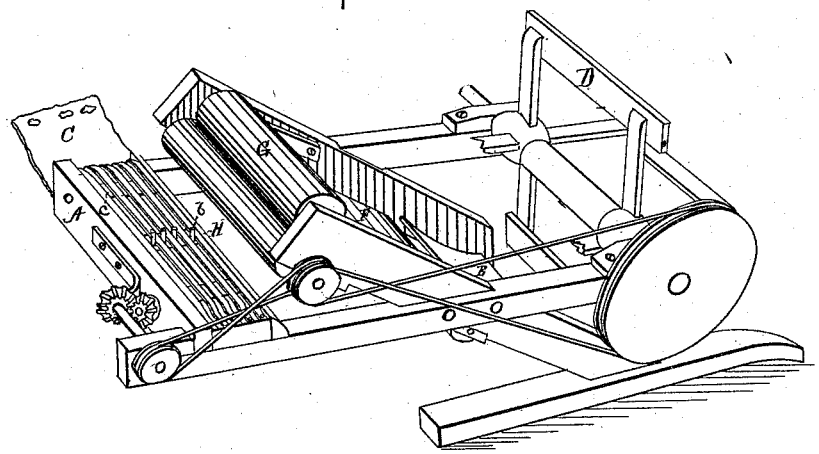
FIG. II.
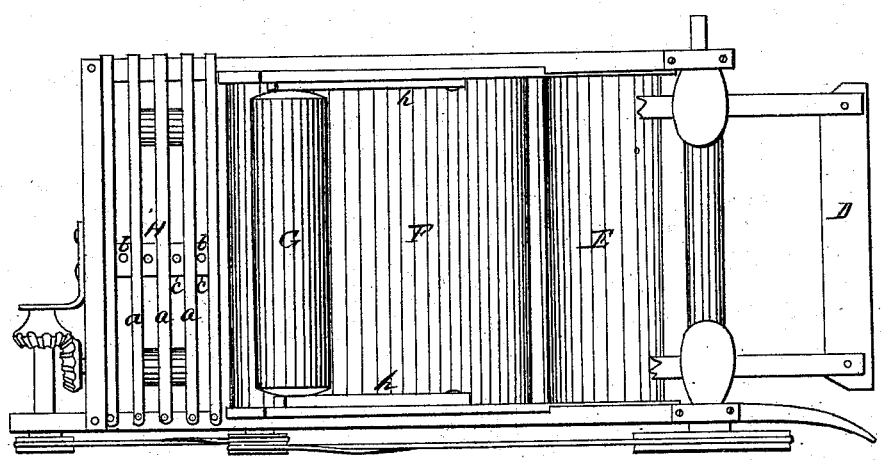
WITNESSES.
F. B. Townsend,
James Stevenson
INVENTOR
Peter Kline
per attys.
A. H. Evans & Co.

UNITED STATES PATENT OFFICE.

PETER KLINE, OF LISBON, IOWA.

IMPROVEMENT IN HARVESTERS.

Specification forming part of Letters Patent No. 172,034, dated January 11, 1876; application filed June 1, 1875.

*To all whom it may concern:*

Be it known that I, PETER KLINE, of Lisbon, Iowa, have invented certain new and useful Improvements in Harvesters; and I do hereby declare the following to be a full, clear, and exact description of the same, reference being had to the accompanying drawings forming a part of this specification, in which—

Figure 1 is a perspective view of a harvester attachment provided with my improvement. Fig. 2 is a top view of the same.

My invention relates to binding attachments for harvesters; and it consists in the combination of devices hereinafter described and claimed.

In order to enable others skilled in the art to make and use my invention, I will proceed to describe the exact manner in which I have carried it out.

In the drawings, A represents the frame of the binding attachment. The flexible apron C receives and holds the grain for the use of the binder. D is a reel to carry the grain from the platform to the canvas apron. Immediately below the reel I place a curved sheet-metal plate, E, to receive the grain on its passage to the canvas apron F. By the introduction of this plate I protect the apron from the wear which would otherwise occur if the action of the reel bore the grain directly against the apron within the frame A, and near the top of the canvas apron F I place the roller G, to hold the grain from falling on the heads on the carrier H. This roller revolves in bearings in the pivoted arms $h\ h$, which are free to move up and down, so that the roller may continually bear upon the grain with uniform pressure, and adjust itself to the amount thereof. The platform H is constructed with parallel bars $a\ a$, as shown in Fig. 2, between which move the teeth $b\ b$ on the bars $c\ c$, attached to an endless traveling belt. (Not shown.) The canvas apron F and the endless belt are operated by the usual gear mechanism. The binding attachment is secured to the sickle-bar.

I am aware that it is not new to carry the grain to the canvas apron by means of a reel, nor is it new to move the grain to the binders' carriage by means of an endless belt; these, therefore, are not my invention.

Having thus described my invention, what I claim as new, and desire to secure by Letters Patent, is—

In a binding attachment for harvesters, the combination of the reel D, plate E, endless apron F, roller G in yielding bearings, slatted platform H, and traveling toothed bars $b\ c$, substantially as and for the purpose set forth.

PETER KLINE.

Witnesses:
JOHN E. KURTZ,
S. A. KURTZ.